United States Patent
Singh et al.

(10) Patent No.: US 8,983,716 B2
(45) Date of Patent: Mar. 17, 2015

(54) TIRE SLIP ANGLE ESTIMATION SYSTEM AND METHOD

(71) Applicant: The Goodyear Tire & Rubber Company, Akron, OH (US)

(72) Inventors: Kanwar Bharat Singh, Stow, OH (US); Anthony William Parsons, Domeldange (LU); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 78 days.

(21) Appl. No.: 13/795,541

(22) Filed: Mar. 12, 2013

(65) Prior Publication Data

US 2014/0163816 A1     Jun. 12, 2014

Related U.S. Application Data

(60) Provisional application No. 61/734,526, filed on Dec. 7, 2012.

(51) Int. Cl.
| | |
|---|---|
| *B60W 40/10* | (2012.01) |
| *B60C 23/00* | (2006.01) |
| *B60T 8/00* | (2006.01) |
| *B60T 8/172* | (2006.01) |

(52) U.S. Cl.
CPC . *B60C 23/00* (2013.01); *B60T 8/00* (2013.01); *B60W 40/10* (2013.01); *B60C 2019/004* (2013.01); *B60T 8/1725* (2013.01); *B60T 2230/02* (2013.01); *B60T 2240/06* (2013.01)
USPC ........................................................ 701/34.4

(58) Field of Classification Search
CPC ...................................................... B60W 40/10
See application file for complete search history.

(56) References Cited

U.S. PATENT DOCUMENTS

| | | | | |
|---|---|---|---|---|
| 7,546,764 | B2 * | 6/2009 | Morinaga et al. ................ | 73/146 |
| 7,552,628 | B2 | 6/2009 | Mancosu et al. ................ | 73/146 |
| 2008/0103659 | A1 | 5/2008 | Mancosu et al. ................ | 701/41 |
| 2009/0055040 | A1 * | 2/2009 | Nagaya .......................... | 701/29 |
| 2011/0199201 | A1 | 8/2011 | Brusarosco et al. .......... | 340/438 |

FOREIGN PATENT DOCUMENTS

| | | | | |
|---|---|---|---|---|
| EP | 1862425 | 12/2007 | ................ | B67C 3/00 |
| JP | 2009208621 | 9/2009 | ............. | B60C 19/00 |
| JP | 2012131284 | 7/2012 | ............. | B60C 19/00 |
| JP | 2012162259 | 8/2012 | ............. | B60C 23/04 |
| WO | 2011/054363 | 5/2011 | ......... | B60G 17/0165 |

OTHER PUBLICATIONS

European Search Report received by Applicants Apr. 4, 2014.

* cited by examiner

*Primary Examiner* — John Q Nguyen
*Assistant Examiner* — Michael Kerrigan
(74) *Attorney, Agent, or Firm* — Richard B. O'Planick

(57) ABSTRACT

A slip angle estimation includes a tire having one or more first and second strain sensor(s) affixed to opposite respective first and second tire sidewalls. The sensors measure a tire strain in their respective sidewalls and generate a sidewall strain signal indicative of strain present within the tire sidewalls. A slip angle estimation is made by estimating the difference in the signal slope of the sensors in the opposite sidewalls. A load estimation is further made for the tire from the inner and outer sidewall strain signals and the load estimation is used in the slip angle estimation.

20 Claims, 14 Drawing Sheets

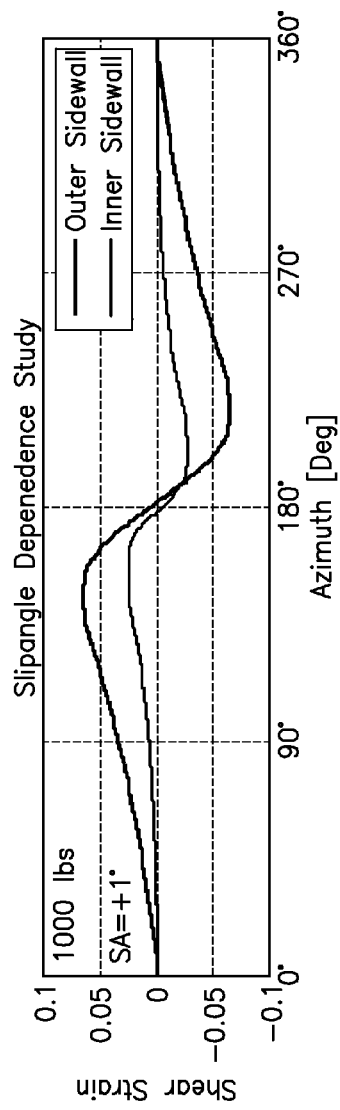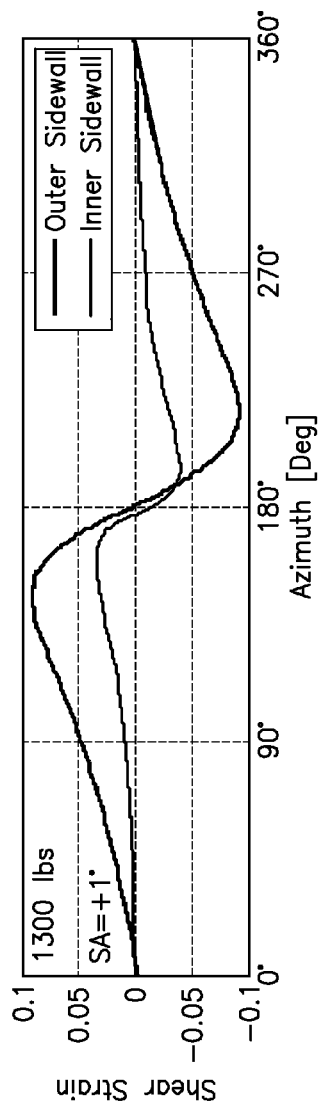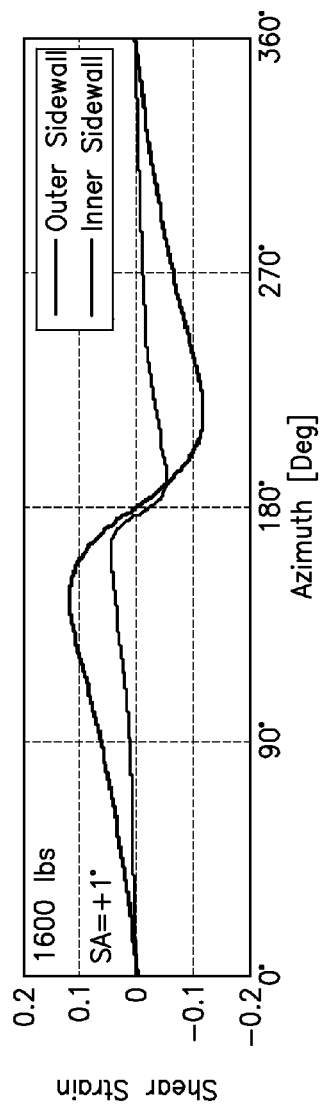

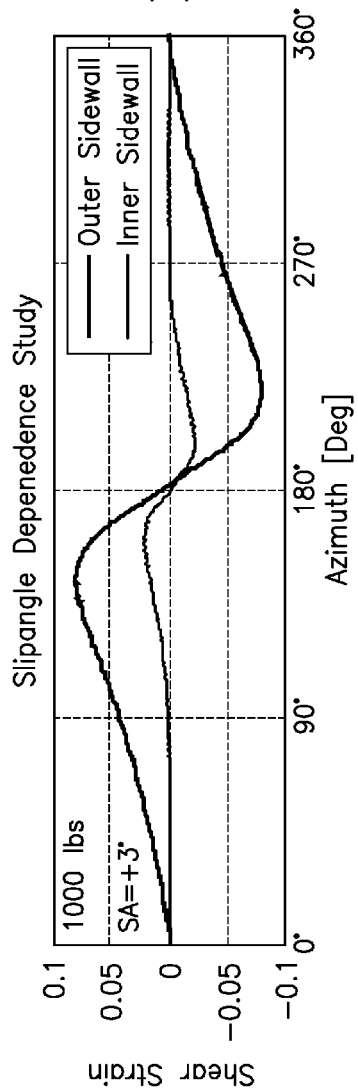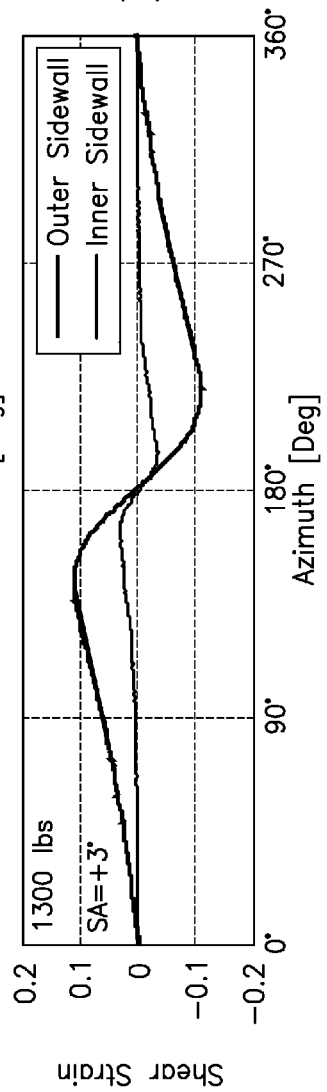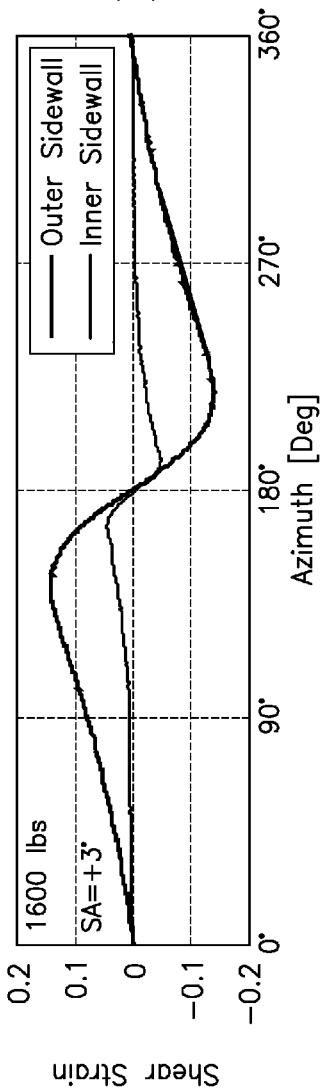

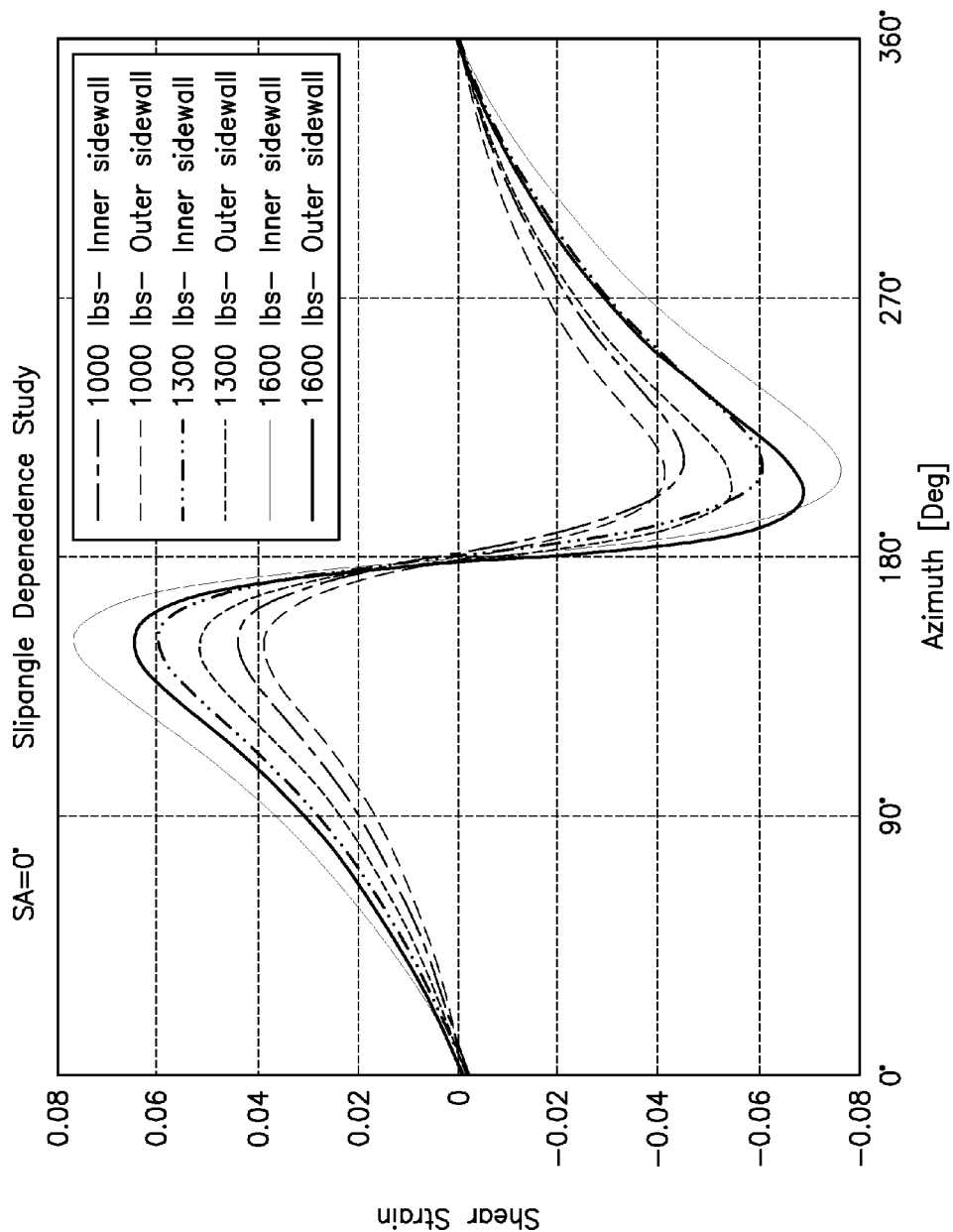

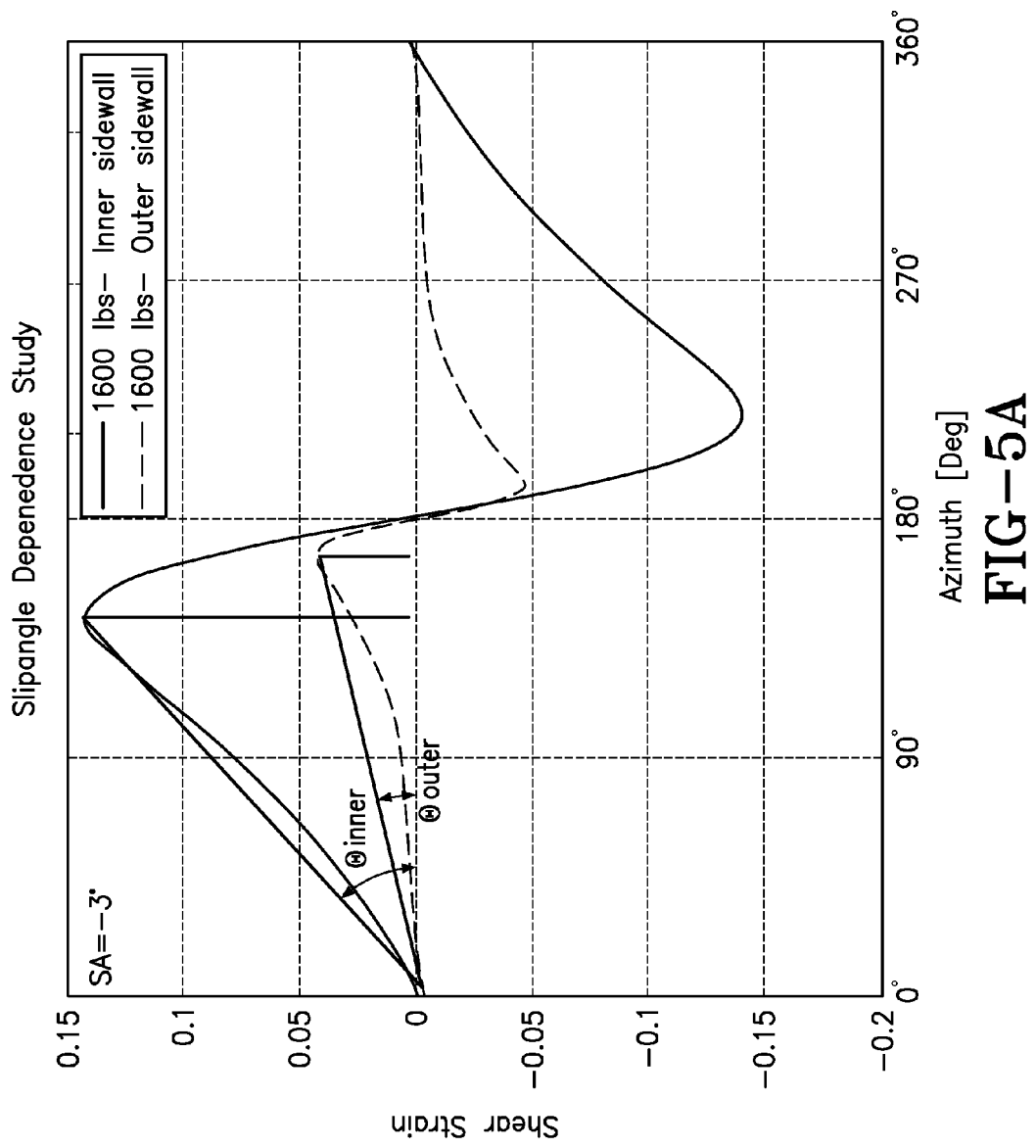

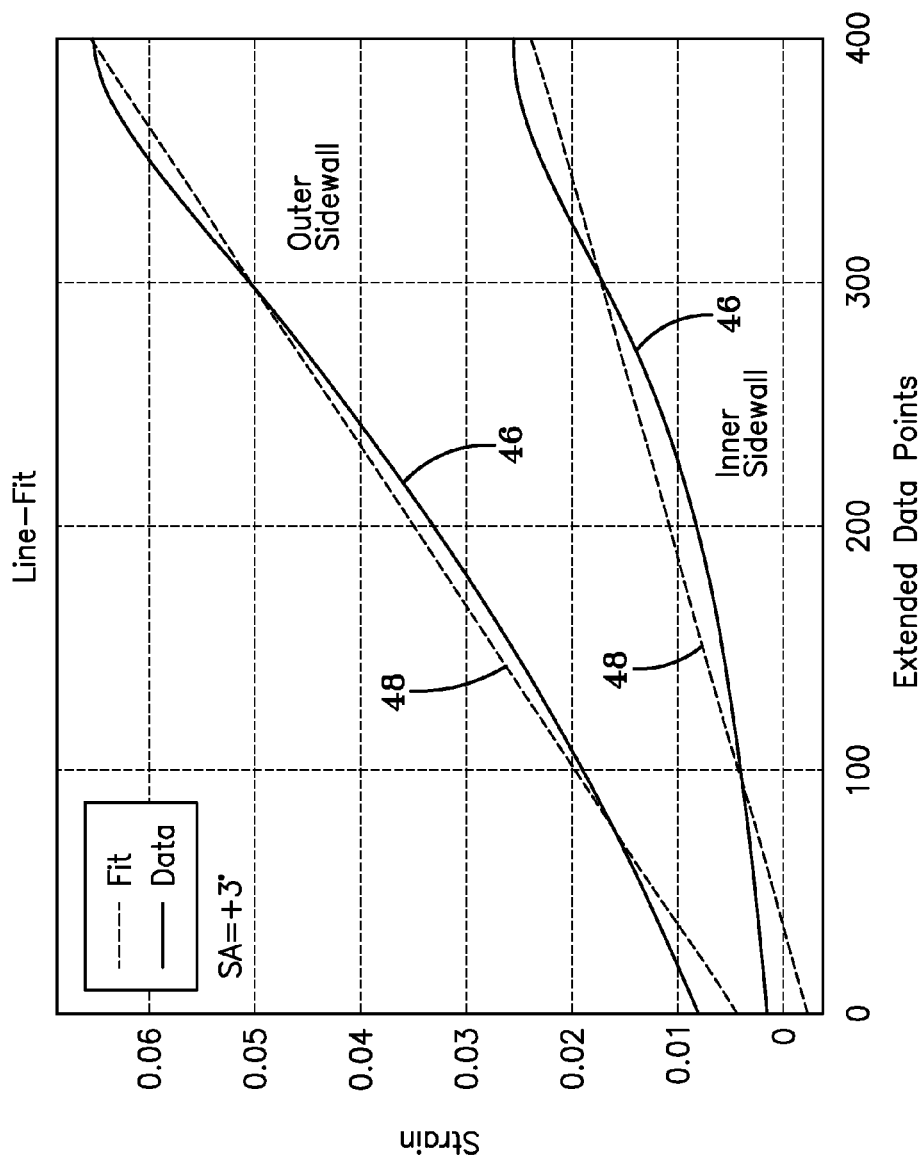

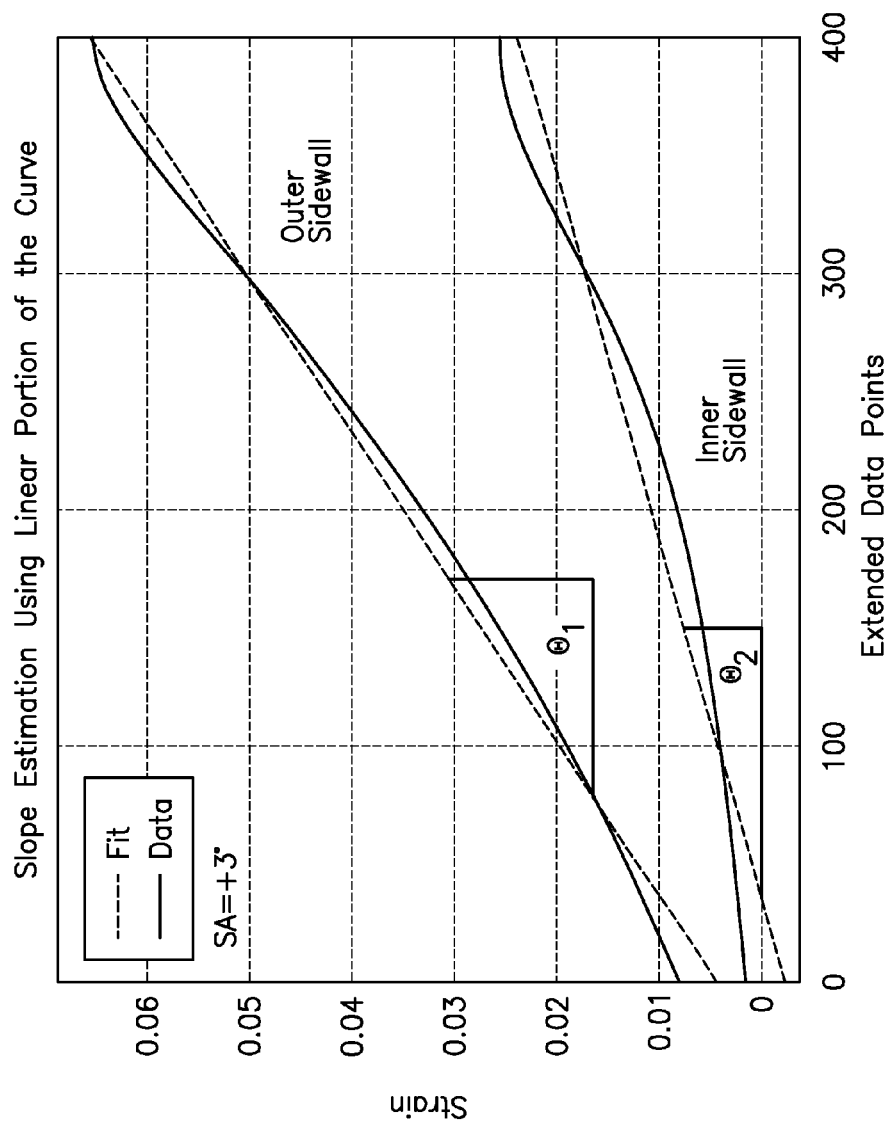

TIRE SLIP ANGLE ESTIMATION SYSTEM AND METHOD

FIELD OF THE INVENTION

The invention relates generally to tire monitoring systems for collecting measured tire parameter data during vehicle operation and, more particularly, to a system and method for estimating vehicle tire slip angle based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire slip angle are important considerations for vehicle operation and safety. It is accordingly further desirable to measure tire slip angle and communicate slip angle information to vehicle systems such as braking and stability control systems in conjunction with the measured tire parameters of pressure and temperature.

SUMMARY OF THE INVENTION

According to an aspect of the invention a slip angle estimation system is provided for estimating a vehicle tire slip angle. The system includes a tire having one or more first and second strain sensor(s) affixed to opposite respective first and second tire sidewalls. The sensors measure a tire strain in their respective sidewalls and generate a sidewall strain signal indicative of strain present within the tire sidewalls. A slip angle estimation is made by estimating the difference in the signals of the sensors in the opposite sidewalls.

In another aspect, the first and the second sidewall strain sensors are strain sensing gauges mounted respectively to an axially inward surface of inner and outer tire sidewalls positioned to detect sidewall deflection.

Pursuant to another aspect of the invention, the slip angle estimation includes detecting a peak in the sidewall strain signals from the first and the second strain sensing devices; extracting a linear portion of the sidewall strain signals; fitting a line by least squares to the extracted linear portion of the sidewall strain signals; determining a slope of the extracted linear portion of the sidewall strain signals; and estimating the difference in the signal slopes.

The invention, in another aspect, a load estimation is made for the tire from the sidewall strain signals obtained from the first and the second strain sensing devices, and the load estimation is used in the slip angle estimation.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIGS. 2A, 2B and 2C are a series of variable load graphs similar to FIGS. 1A, 1B and 1C but at a slip angle of +1 degree.

FIGS. 3A, 3B and 3C are a series of load graphs at a range of loads similar to FIGS. 1A, 1B and 1C but at a slip angle of +3 degrees.

FIG. 4A is a graph summarizing the variable loading results of FIGS. 1A through 1C at a slip angle of 0 degrees.

FIG. 5A is a graph showing inner and outer sidewall angles at a slip angle of −3 degrees at a tire loading of 1600 pounds.

FIG. 7A is a graph showing the algorithm step of fitting a line to the extracted curve in a least squares sense.

FIG. 7B is a graph showing the algorithm step of estimating the slope of the extracted curve.

DETAILED DESCRIPTION OF THE INVENTION

Figure 1A:
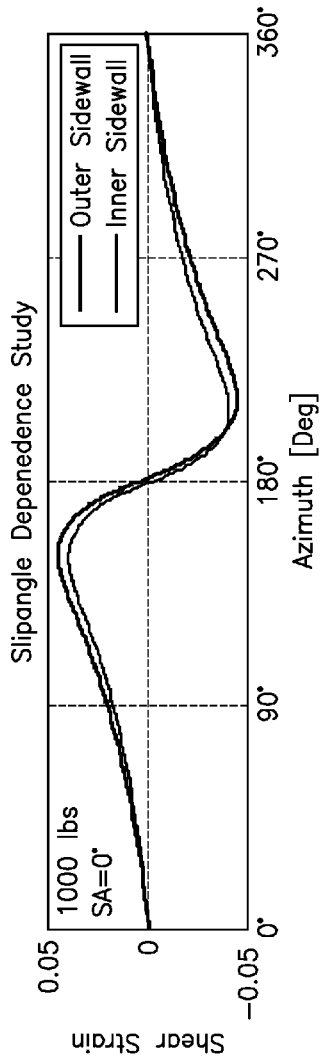
FIGS. 1A, 1B and 1C are a series of graphs showing slip angle dependence on measured shear strain in a tire inner and outer sidewalls, the graphs showing shear strain for tire inner and outer sidewalls loaded at 1000, 1300 and 1600 pounds at a slip angle of 0 degrees.

A system and method of estimating a load bearing on a vehicle tire is provided in co-pending U.S. patent application Ser. No. 13/609,695, filed Sep. 11, 2012, entitled "TIRE SIDEWALL LOAD ESTIMATION SYSTEM AND METHOD", incorporated herein in its entirety by reference. Disclose therein is a system which includes an inflation pressure measuring sensor attached to the tire for measuring a tire cavity inflation pressure level; and one or more piezofilm deformation measuring sensors mounted to one or both of the tire sidewalls. The deformation measuring sensor(s) generate within the tire footprint a deformation signal having signal power level indicative of a level of sidewall deformation within the footprint contact patch. Power-to-load maps adjusted for tire inflation pressure are generated and stored for the tire, the maps correlating a range of load levels to a range of signal power levels whereby operatively enabling a load level to be identified for each signal power level on an inflation pressure adjusted basis. In the system embodying a plurality of deformation measuring sensors, mounted to both sidewalls, an average of the signal power level from each sensor is used in referencing the power-to-load maps in order to identify a corresponding load level on the tire on an inflation pressure adjusted basis.

The system of the co-pending application incorporated herein is incorporated within a tire of conventional construction, having a tread component at a tire crown region which contacts a ground surface during rolling operation. The tire mounts to a rim in conventional manner. A tire deformation measuring sensor, such as a piezo-film bending sensor, mounts to an inner sidewall and another sensor to an outer sidewall. The inner and outer sidewall mounted sensors may be affixed by adhesive to an innerliner defining the tire cavity. The sensors are preferably piezoelectric bending sensors, or other suitable strain sensors commercially available, of a type operational to bend and reconfigure when subjected to a bending force and thereupon generate an electrical signal indicative of the magnitude of bending reconfiguration in the sensor body. The bending signals are thus indicative of the magnitude of the bending strain within the sidewall to which the sensor is attached. When the bending force is removed, the sensor resumes its original configuration. By way of example, without intent to limit the scope of the invention, a piezoelectric bending sensor such as bending film sensor commercially offered by Measurement Specialties, Inc., located at 1000 Lucas Way, Hampton, Va. 23666, may be employed. The piezoelectric sensor functionally mounts flush to a surface and a piezo-resistive film sensor body, when subjected to a bending force, bends and generates a signal proportional to the magnitude of bending force on the body.

In addition to the sensor signals from the inner and outer sidewall sensors, inflation pressure is measured by a tire pressure monitoring system (TPMS) mounted to the tire, of a type commercially available. The TPMS system includes a pressure sensor that mounts to a tire in communication with an internal tire air cavity and functions to measure the air pressure within the tire cavity and transmit the measured pressure data to a receiver. The measurement of the TPMS may further include a temperature sensor that measures tire temperature. Measured pressure value is transmitted by the TPMS system to a data processor for recordation and analysis. Should the pressure falls below a minimum threshold, a warning will be generated to the vehicle operator.

The system feeds the tire deformation sensor signals from the inner and outer sidewalls to a signal processing unit for processing in order to ascertain from the signal an average signal power estimation. From stored memory files, and signal power load maps stored in such memory, an estimated tire loading is derived using a tire load estimation algorithm.

In addition to estimating tire load from the sidewall mounting piezo-bending sensors, it is useful and possible to utilize such sensors in the subject system for estimating tire slip angle. "Slip Angle" is the angle between a vehicle's direction of ravel and the direction in which the front wheels are pointing. Slip angle is a measurement of the deviation between the plane of tire rotation and the direction of travel of a tire. The slip angle of a moving vehicle tire is useful information in vehicle control and stability systems. As braking and other control systems in vehicles become more interrelated, an estimation of tire slip angle is useful in stability and control system such as anti-locking brakes.

Figure 9:
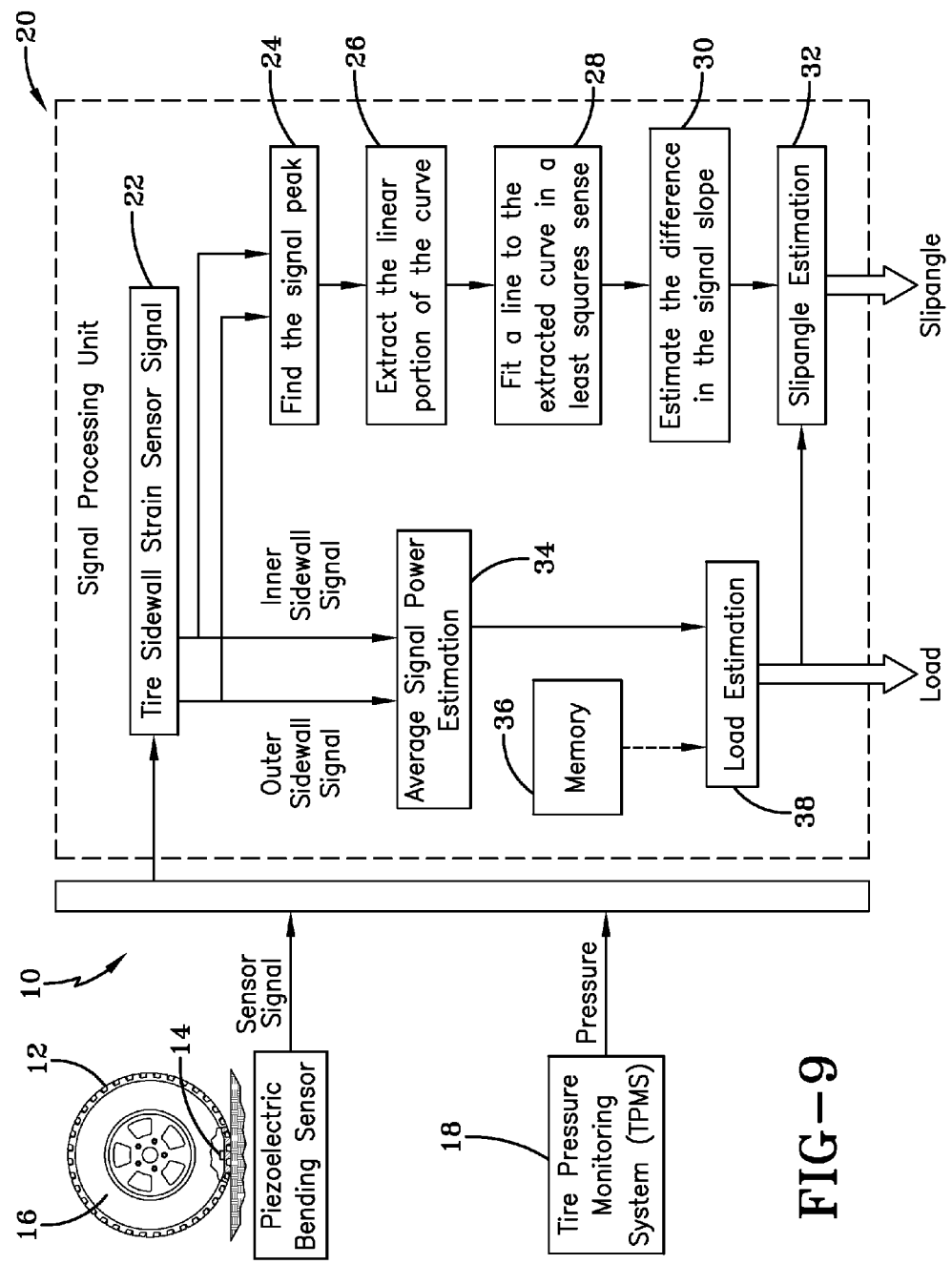
FIG. 9 is a slip angle estimation algorithm functional block diagram.

The subject slip angle estimation system and method 10 is shown in block level diagram in FIG. 9. One or more piezoelectric bending sensors 14 are mounted to each sidewall 16 of a vehicle-supporting tire 12. The bending sensors 14 are of a commercially available type that will generate a detection signal when the sensor is subjected to a bending moment. When the bending moment is removed, the sensor resumes its unbended condition. Each sensor 14, mounted respectively to an inner and an outer sidewall, accordingly will generate a signal of a shape shown in FIGS. 4A through 4C. Also mounted to the tire 12 is a tire pressure monitoring system (TPMS) 18 which monitors the air pressure within the tire cavity. A signal processing unit 20 receives sensor signals from the inner and outer sidewall piezoelectric sensors 14 and pressure data from the TPMS unit. The tire inner and outer sidewall strain sensor signals 22 are analyzed by peak detection processing to find the signal peaks 24; extract the linear portion of the signal curves 26; and fit by least squares application a line to fit the extracted linear portions of the curves. The difference in the signal slopes of the extracted linear portions of the inner and outer curves is then estimated and compared to a pre-stored memory database for the tire 12. An estimated slip angle is extracted from the database based on the estimated slope differential between the inner and outer sidewall sensor curves.

In addition, as set forth in co-pending U.S. application Ser. No. 13/609,695 incorporated herein in its entirety by reference, a load estimation on the tire 12 is made using the same sensor signals from the piezoelectric bending sensors 14 mounted in the tire. The inner and outer sidewall signals are averaged to determine an average signal power estimation 34. From a pre-generated memory database 36, a load estimation 38 is made. The load estimation may be used independently to advise a user-operator of an overload situation or in the operational performance of vehicle control and stability systems. In addition, the estimated load may be incorporated into the database memory tables used in the performance of the slip angle estimation 32. The slip angle estimation made as result of the FIG. 9 algorithm is thus available for use in vehicle control and stability systems such as braking.

Figure 1B:
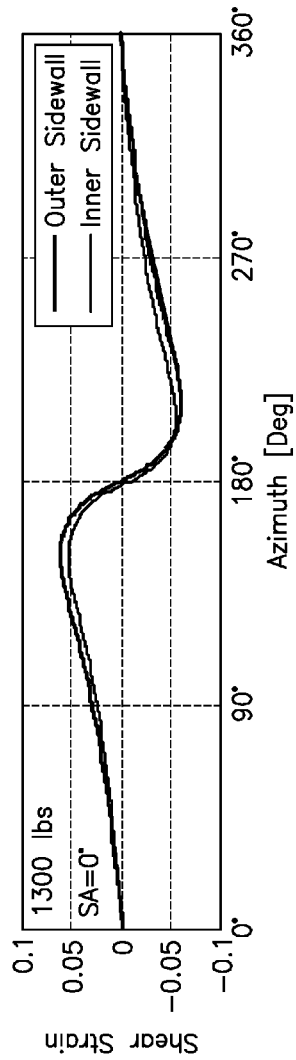
Figure 1C:
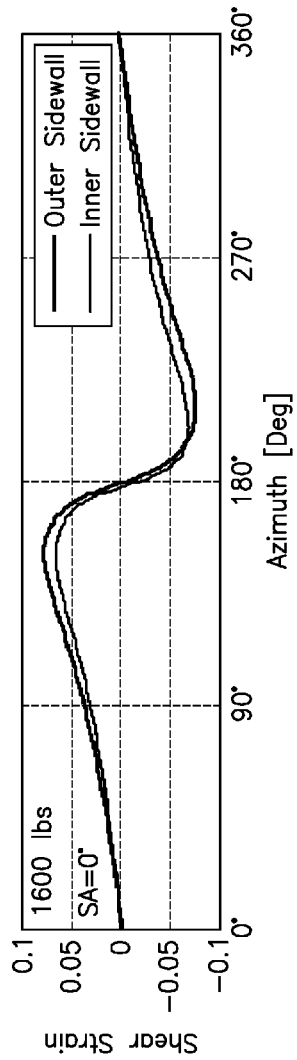

The subject slip angle estimation system and method has been experimentally validated as will be appreciated from the slip angle dependence study graphs of FIGS. 1A through 1C; FIGS. 2A through 2C; and FIGS. 3A through 3C. In FIGS. 1A through 1C, a sidewall shear strain signal is shown for the outer and inner sidewall signals at a tire loading of 1000, 1300, and 1600 pounds for a slip angle of 0 degrees. It will be noted that the curves of the inner and outer sidewall signals are differentiated and thus capable of slope evaluation and comparison by the algorithm of FIG. 9. The curves of the inner and outer sidewall sensors closely compare as would be expected for a slip angle of 0 degrees.

In FIGS. 2A through 2C, the graphs are shown for the same three loading conditions but at a slip angle of one degree. The curves from the inner and outer sidewall signals are appreciable more divergent in their slope differential as would be expected. FIGS. 3A through 3C show the curves for a slip angle of three degrees, and indicate a still greater slope divergence between the inner and outer sidewall sensor signals.

Figure 4B:
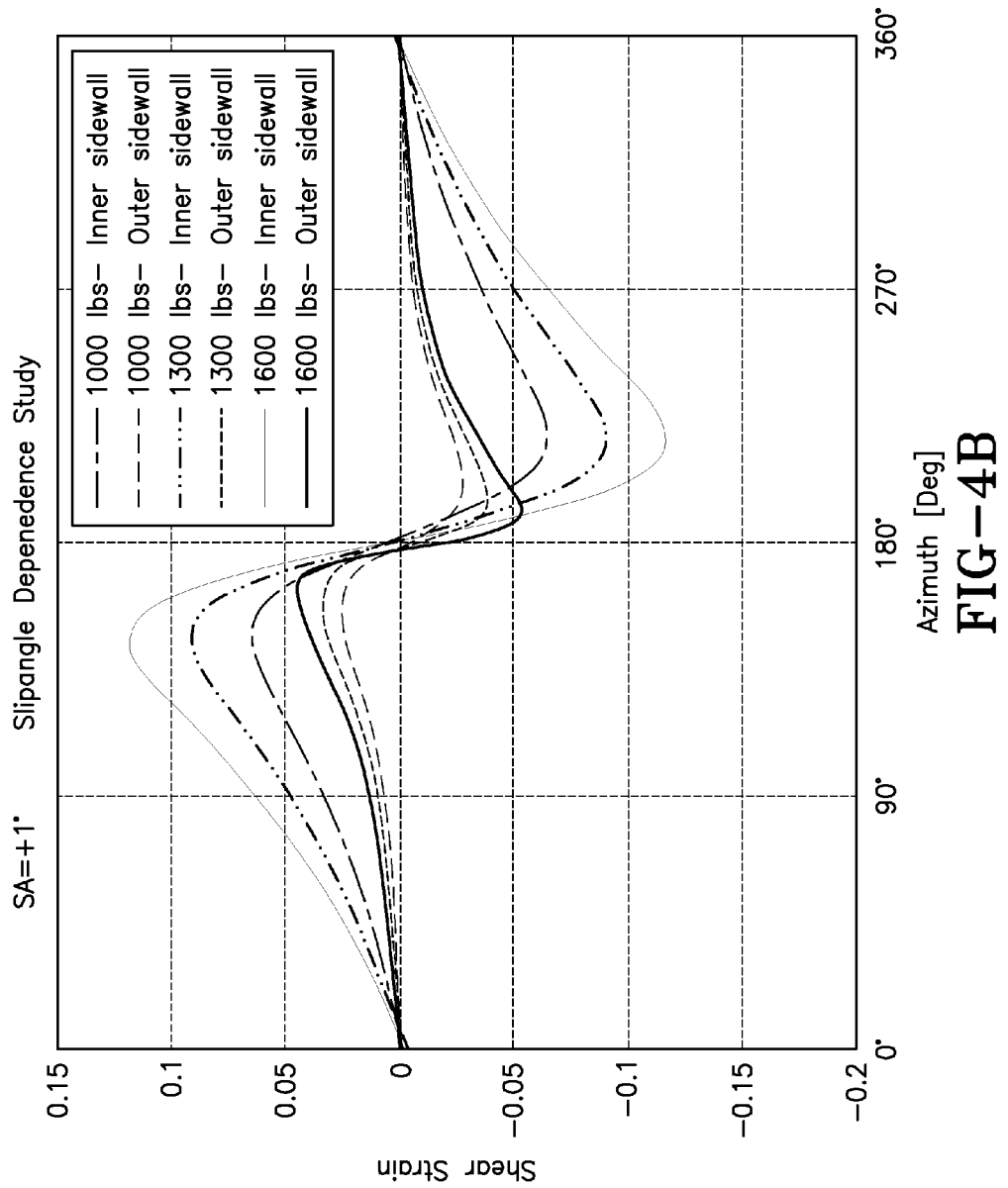
FIG. 4B is a graph summarizing the variable loading results of FIGS. 2A through 2C at a slip angle of +1 degree.
Figure 4C:
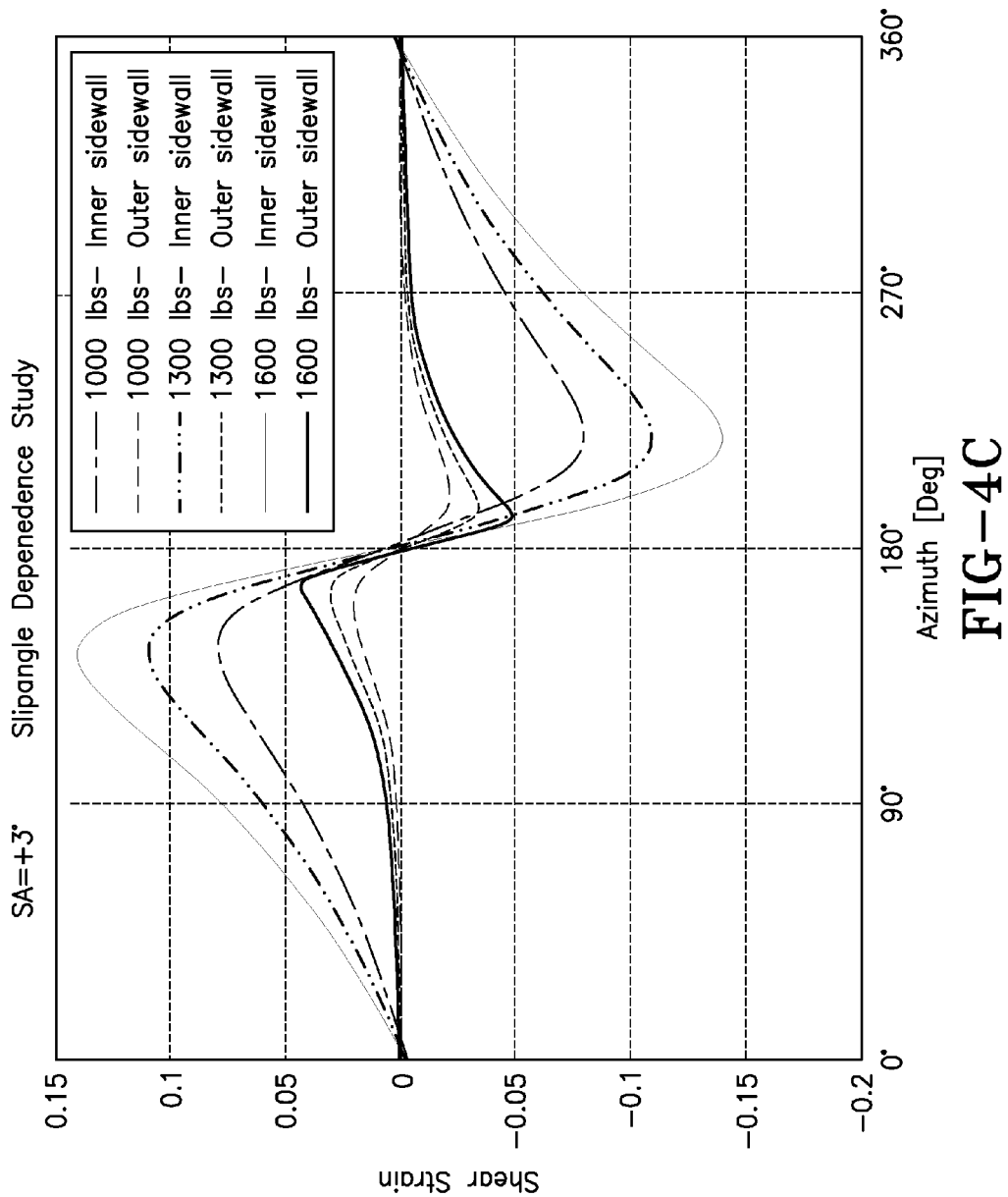
FIG. 4C is a graph summarizing the variable loading results of FIGS. 3A through 3C at a slip angle of +3 degrees.

FIGS. 4A through 4C summarizes the results for the sensor signals from the inner and outer sidewall piezoelectric sensors at select tire loading conditions of 1000, 1300, and 1600 pounds. The change in shape and corresponding slope differential between the inner and outer sidewall sensor curves validates the incorporation of load estimation data 38 into the slip angle memory data used to make the slip angle estimation 32 of FIG. 9. FIG. 5A shows enlarged inner and outer sidewall sensor signals at a tire load of 1600 pounds and a slip angle of −3 degrees. The method of distinguishing between the slope of the two signals is shown by the angle θ for each curve. The illustrated region of the curves from which slope is differentiated in FIG. 5A may not be the most accurate but does show that differentiated slope between the two curves is possible.

Figure 5B:
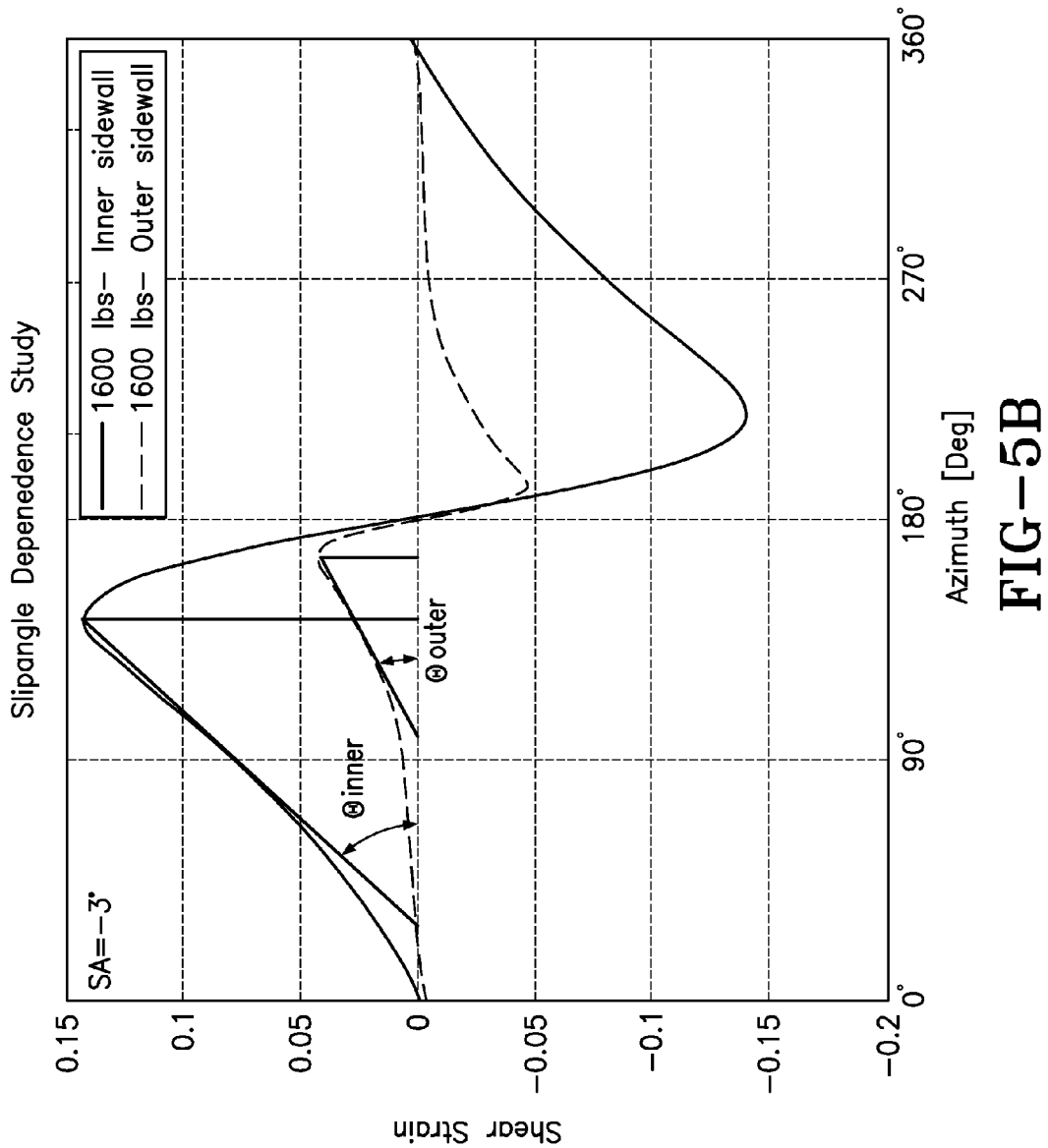
FIG. 5B is a graph showing slope estimation for the inner and outer sidewall signals along a linear portion of the curve.
Figure 6A:
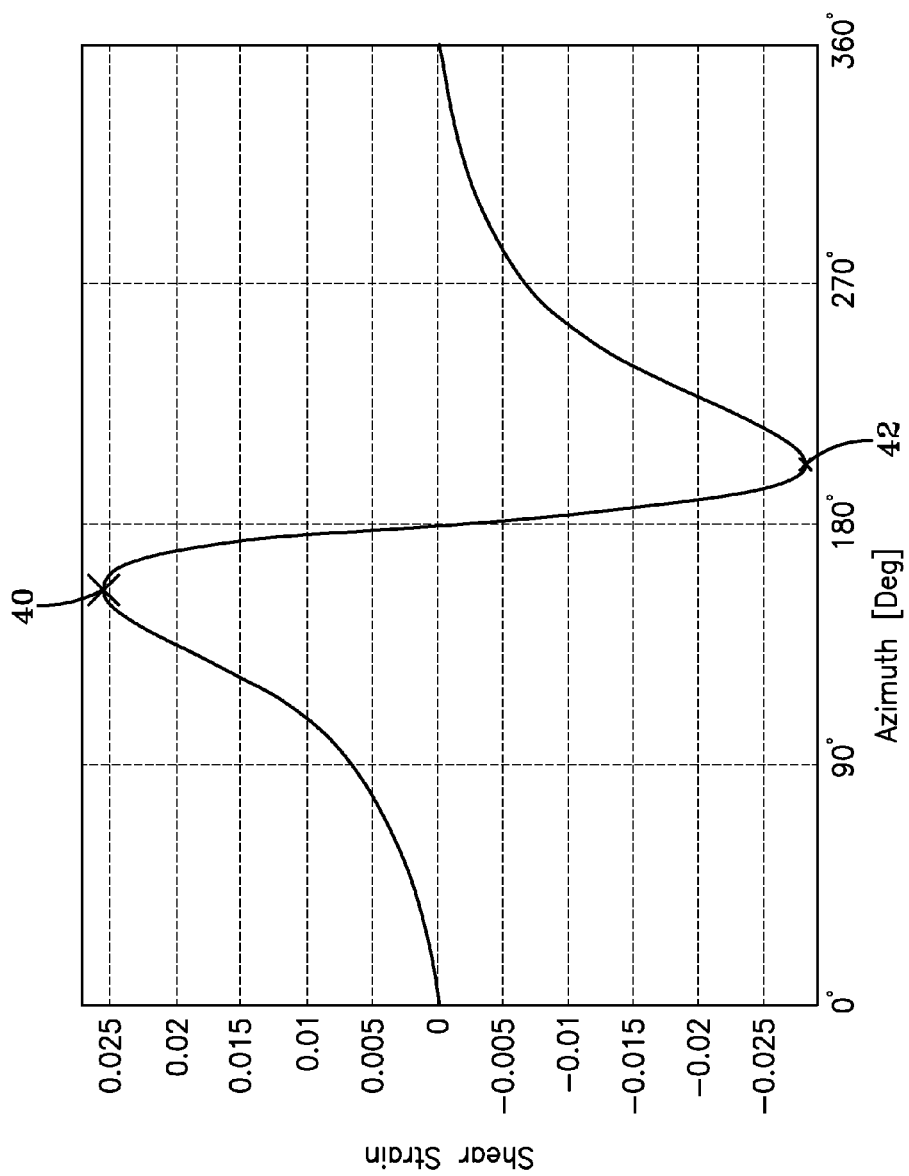
FIG. 6A is a graph showing the algorithm detail of finding the signal peak.
Figure 6B:
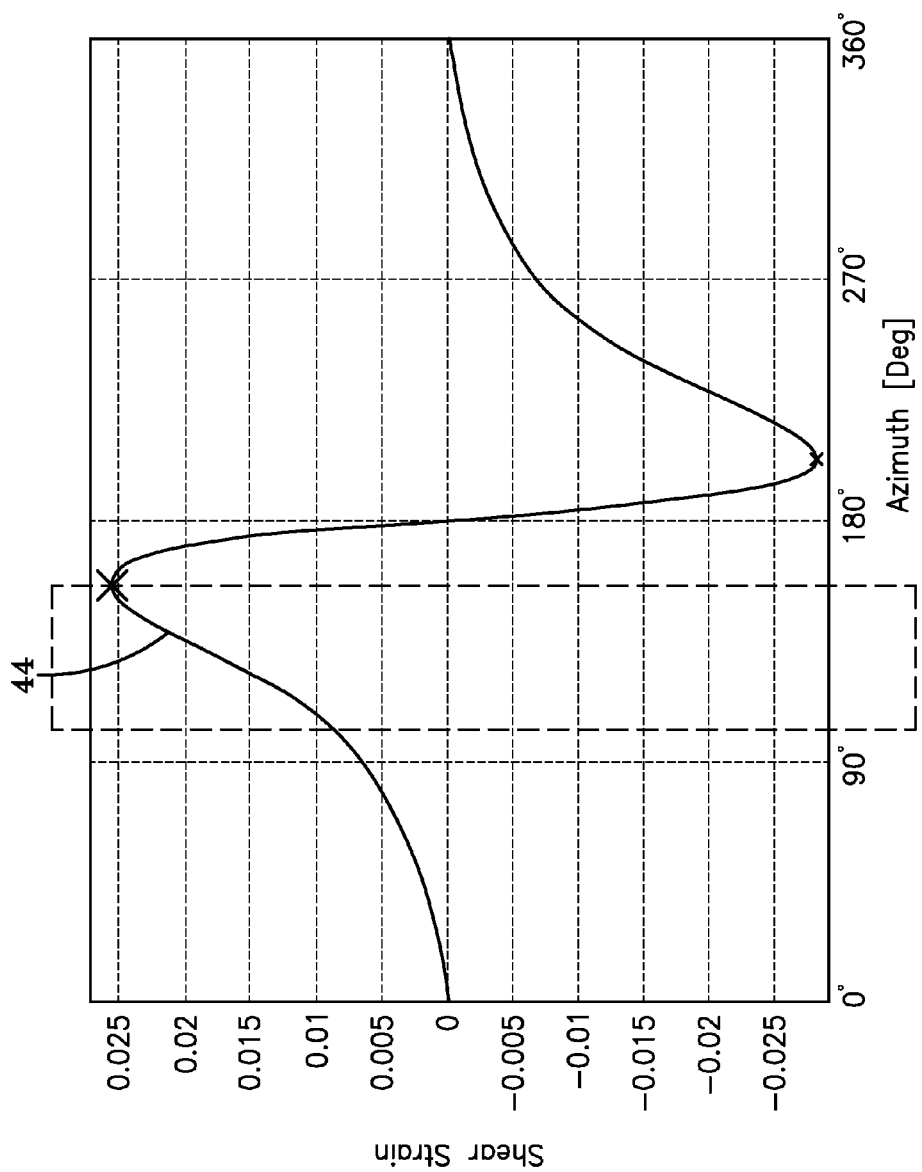
FIG. 6B is a graph showing the algorithm detail of extracting the linear portion of the curve.
Figure 8:
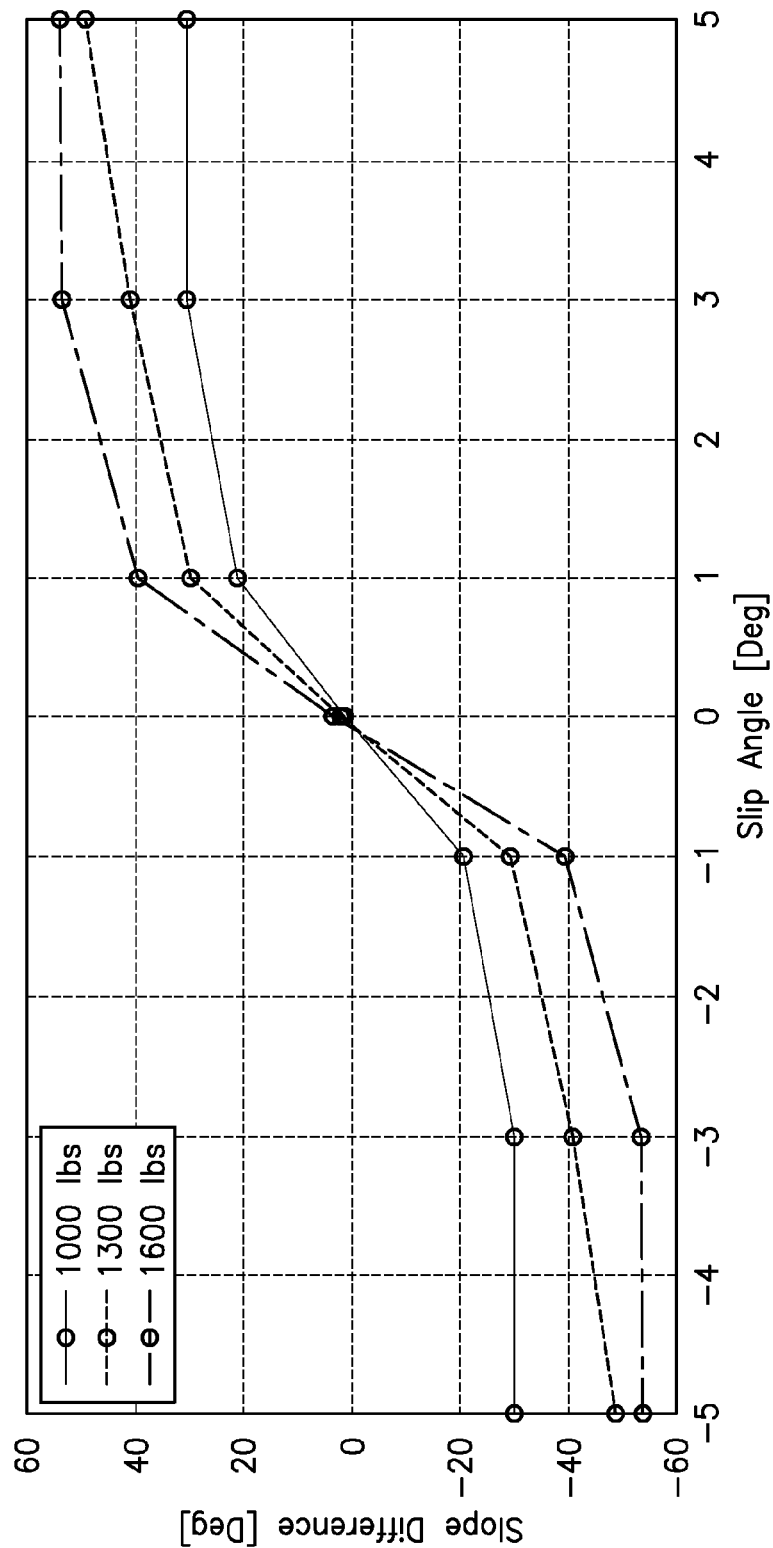
FIG. 8 is a summary graph of slope difference [deg] vs. slip angle [deg] demonstrating close correlation for three loading conditions.

In FIG. 5B a further illustration is made of the differentiation between inner and outer sidewall sensor curves at a loading of 1600 pounds and slip angle of −3 degrees. FIG. 5B further illustrates that a straight line estimation of the slope angle θ generated by the linear portion of each curve is demonstrably and analytically possible. FIG. 6A shows a sidewall sensor signal curve used in step 24 of the FIG. 9 algorithm. The signal peaks 40, 42 are detected for each of the inner and outer sidewall sensor curves generated by the strain sensors in each sidewall. FIG. 6B illustrates step 26 of FIG. 9 by the extraction of one linear portion 44 of the curve for slope analysis. For the study of FIG. 6B, the portion of the curve selected was approximately one-third (⅓) of the signal to the left of the signal peak 34 estimated in FIG. 6A (step 24). An equivalent extracted portion of the inner and outer sidewall signal curves is used for the purpose of slope comparison and analysis. FIG. 7A illustrates step 28 of FIG. 9 as a line 48 is fit to the extracted portion 46 of each of the inner and outer sidewall sensor curves in a least squares sense. The line-fit results resulted in a Mean Square Error (R) for the outer sidewall data of 2.24e-006 and for the inner sidewall data 3.91e-006. FIG. 7B shows slope estimation (step 30 of FIG. 9) using the linear portion of each of the inner and outer sidewall sensor curves, resulting in a slope estimation of $\theta_1$ and $\theta_2$. FIG. 8 shows a summary graph of slope difference [Deg] vs. slip angle [Deg] for three load levels: 1000, 1300, and 1600 lbs. It will be appreciated that data of the type reflected in FIG. 8 may be generated for a specific tire and stored in a memory database. Once the slope difference $\theta_1$-$\theta_2$ and estimated load is determined from FIG. 9 system and method, the memory database may be consulted to identify the slip angle corresponding to the slope differential and load criteria.

From the foregoing, it will be understood that the strain on both the sidewalls of each tire supporting a vehicle is monitored simultaneously. The signals from strain sensor(s) mounted to each tire sidewall are analyzed by finding the signal peak and extracting a linear portion of the signal curves relative to the detected signal peaks. A line is fit to the extracted curve in a least squares sense and the difference in fit line slopes is estimated. Applying the slope differential to a tire specific, load adjusted database will yield an estimation of slip angle.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A slip angle estimation system for estimating a vehicle tire slip angle comprising:
at least one tire supporting a vehicle;
first and second strain sensing means affixed to opposite respective first and second tire sidewalls of the tire to operably measure a tire strain in the respective first and second sidewalls, the first and the second strain sensing means each generating a sidewall strain signal indicative of strain present within the respective tire sidewalls;
tire slip angle estimation means for calculating a tire slip angle based upon a comparison of the sidewall strain signals from the first and the second strain sensing means.

2. The slip angle estimation system of claim 1, wherein the first and the second sidewall strain sensing means each comprises a strain sensing device mounted respectively to an axially inward surface of the first and the second tire sidewalls.

3. The slip angle estimation system of claim 2, wherein the sidewall strain signals from the first and the second strain sensing devices each comprise a signal curve operably representing sidewall deflection of the respective first and the second sidewalls.

4. The slip angle estimation system of claim 3, wherein the slip angle estimation means comprises signal peak detection means for detecting a peak in the sidewall strain signal curves from the first and the second strain sensing devices; extraction means for extracting a linear portion of the sidewall strain signal curves; least squares fitting means for fitting a line to the extracted linear portion of the sidewall strain signal curves; and slope estimation means for determining a slope of the extracted linear portion of the sidewall strain signal curves.

5. The slip angle estimation system of claim 4, wherein further comprising computational means for determining a difference in slope of the extracted linear portion of the sidewall strain signal curves from the first and the second strain sensing devices.

6. The slip angle estimation system of claim 5, wherein further comprising a memory database generating a slip angle estimation corresponding to the difference in slope of the extracted linear portion of the sidewall strain signal curves from the first and the second strain sensing devices.

7. The slip angle estimation system of claim 6, wherein further comprising load estimation means for generating an estimated load on the tire from the sidewall strain signal curves from the first and the second strain sensing devices.

8. The slip angle estimation system of claim 7, wherein the memory database generates a slip angle estimation corresponding to the difference in slope of the extracted linear portion of the sidewall strain signal curves from the first and the second strain sensing devices adjusted by the estimated load from the load estimation means.

9. The slip angle estimation system of claim 1, wherein further comprising load estimation means for generating an estimated load on the tire from the sidewall strain signal curves from the first and the second strain sensing devices.

10. The slip angle estimation system of claim 9, wherein the memory database generates a slip angle estimation corresponding to the difference in slope of the extracted linear portion of the sidewall strain signal curves from the first and the second strain sensing devices adjusted by the estimated load from the load estimation means.

11. A slip angle estimation method for estimating a vehicle tire slip angle comprising:
mounting first and second strain sensing means to opposite respective first and second tire sidewalls of a tire supporting a vehicle, the first and second strain sensing means operable measure a tire strain in respective first and second sidewalls;
generating from the first and the second strain sensing means a sidewall strain signal indicative of strain present within the respective tire sidewalls;
determining a tire slip angle estimation based on a comparison of the sidewall strain signals from the first and the second strain sensing means.

12. The slip angle estimation method of claim 11, wherein further comprising mounting a strain sensing device of each of the first and the second sidewall strain sensing means respectively to an axially inward surface of the first and the second tire sidewalls.

13. The slip angle estimation method of claim 12, wherein further comprising measuring a deflection of the first and second sidewalls by the first and the second strain sensing devices respectively mounted to the first and the second sidewalls.

14. The slip angle estimation method of claim 13, wherein further comprising:
detecting a peak in the sidewall strain signals from the first and the second strain sensing devices;
extracting an equivalent linear portion from each of the sidewall strain signals;
fitting by a least squares fitting means a line to the extracted linear portion of the sidewall strain signals; and
estimating the slope of the extracted linear portion of the sidewall strain signals.

15. The slip angle estimation method of claim 14, wherein further comprising determining a difference in slope of the extracted linear portion of the sidewall strain signals from the first and the second strain sensing devices.

16. The slip angle estimation method of claim 15, wherein further comprising consulting a memory database indicating a slip angle estimation corresponding to the difference in slope of the extracted linear portion of the sidewall strain signals from the first and the second strain sensing devices.

17. The slip angle estimation method of claim 16, wherein further comprising generating an estimated load on the tire from the sidewall strain signals from the first and the second strain sensing devices.

18. The slip angle estimation method of claim 17, wherein further comprising correlating an estimated slip angle with the estimated load from the load estimation means.

19. The slip angle estimation method of claim 11, wherein further comprising generating an estimated load on the tire from the sidewall strain signals from the first and the second strain sensing devices.

20. The slip angle estimation method of claim 19, wherein further comprising correlating an estimated slip angle with the estimated load from the load estimation means.

* * * * *